Nov. 7, 1950
E. K. CLARK
2,528,579
HEATING APPARATUS
Filed June 11, 1947
3 Sheets-Sheet 1
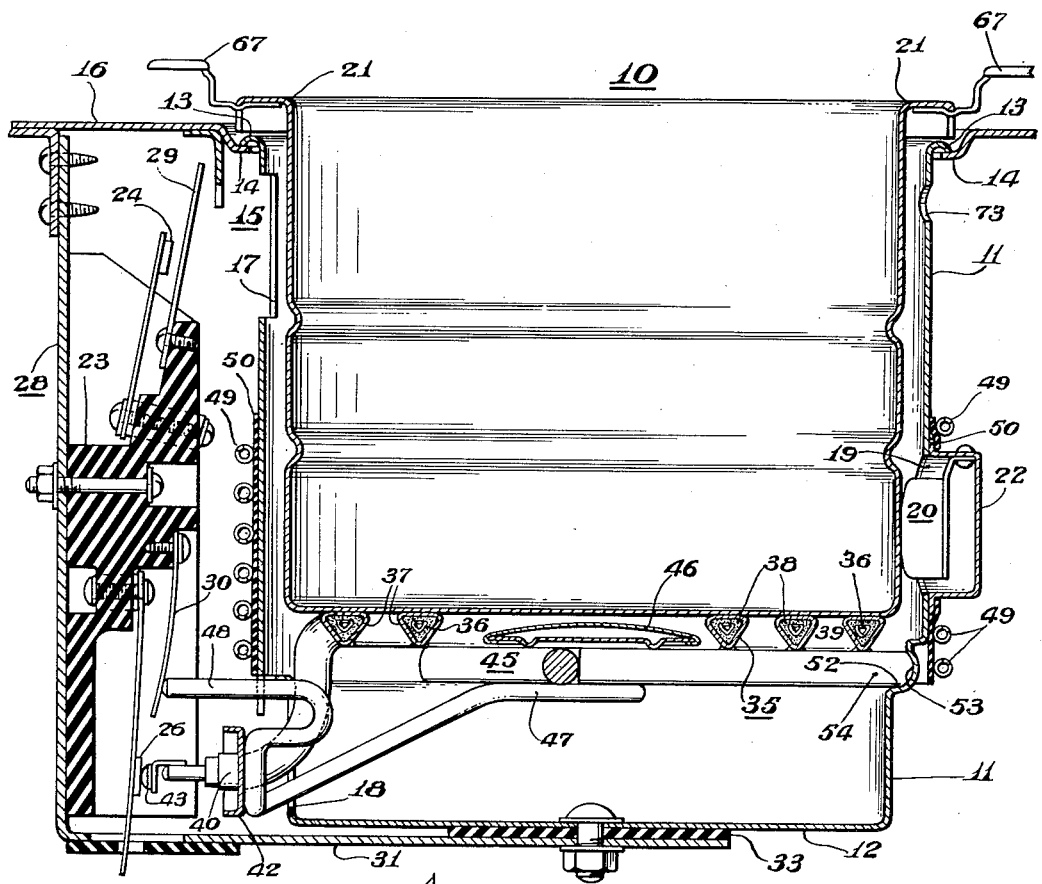
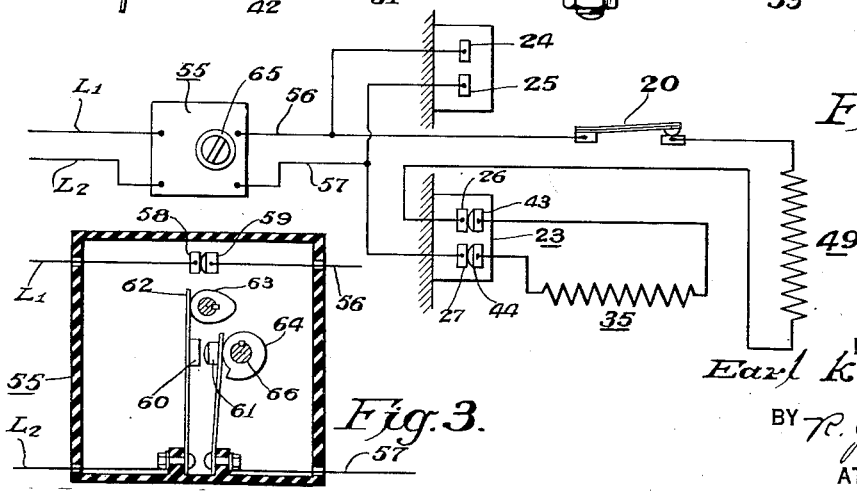
INVENTOR
Earl K. Clark
BY R. J. Eisinger
ATTORNEY

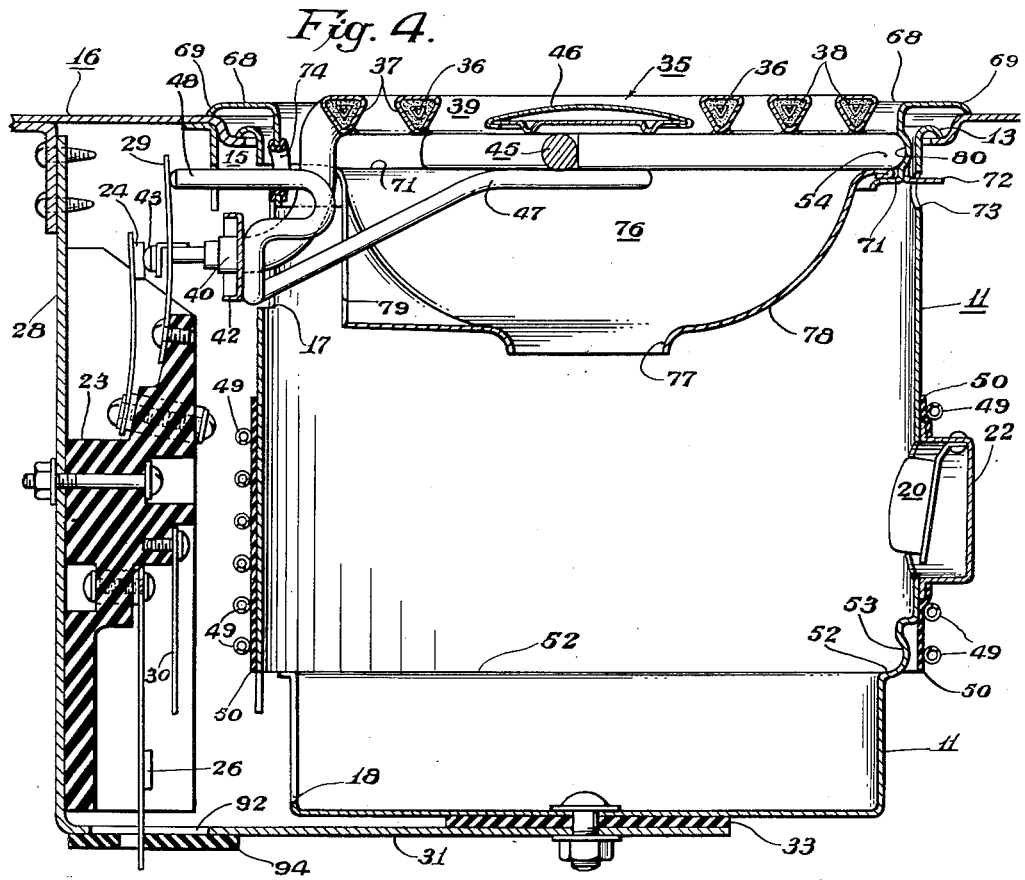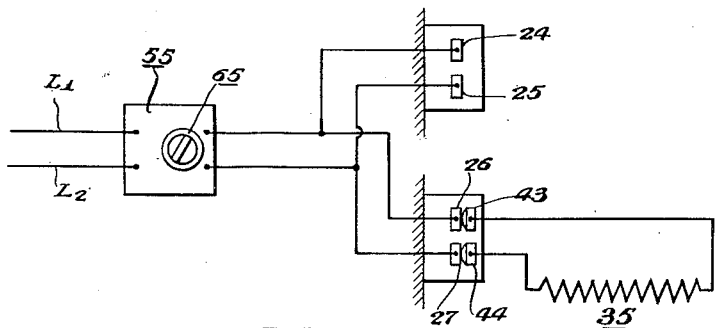

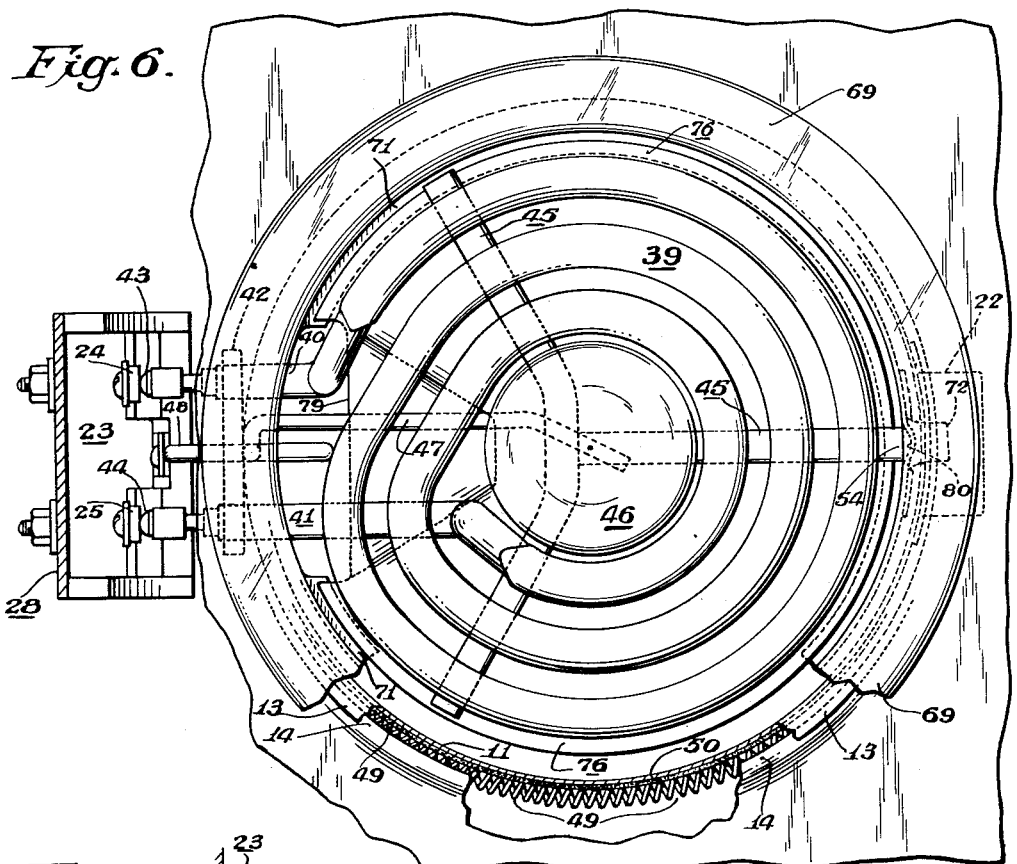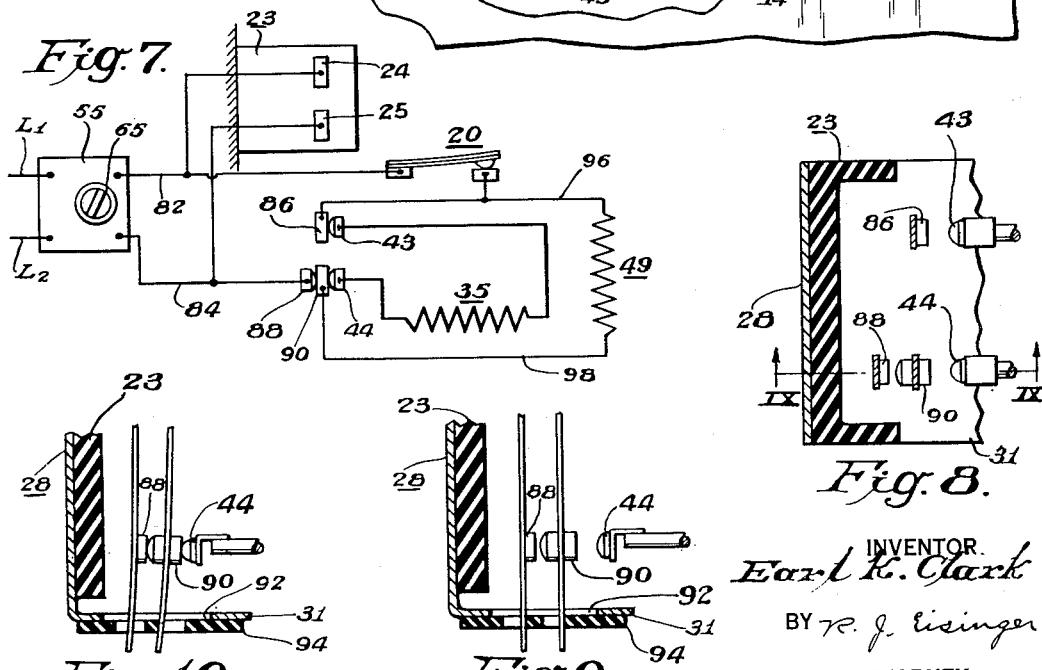

Patented Nov. 7, 1950

2,528,579

UNITED STATES PATENT OFFICE 2,528,579

HEATING APPARATUS

Earl K. Clark, Mansfield, Ohio, assignor to Westinghouse Electric Corporation, East Pittsburgh, Pa., a corporation of Pennsylvania Application June 11, 1947, Serial No. 753,896

5 Claims. (Cl. 219—35)

1

This invention relates to electric ranges and more particularly to deep well cookers for electric ranges.

It is an object of this invention to provide a deep well cooker which can be converted into a surface unit at will.

It is a further object of this invention to provide an arrangement whereby a deep well heating unit can be used as either a deep well heating unit or as a surface heating unit.

Another object of this invention is to automatically disconnect a heating element for the peripheral wall of the deep well cooker when the horizontal heater is in the upper position for use as a surface heating unit.

A still further object of this invention is to provide an arrangement whereby a common switch control will energize both the horizontal heater and the side heater when the unit is used as a deep well cooker and will energize only the horizontal heater when it is in the upper position for use as a surface heating unit.

Other objects of this invention will either be pointed out specifically in the course of the following description of the device embodying the invention or will be apparent from the description.

In the accompanying drawings:

Fig. 1 is a cross-sectional view of a deep well cooker with the horizontal heater in the lower position;

Fig. 2 is a schematic wiring diagram showing the connections for the heaters, the horizontal heater being shown in the lower position;

Fig. 3 is a schematic view of a wattage control switch in section to show its internal connections;

Fig. 4 is similar to Fig. 1 except in this view the deep well pot has been removed and the horizontal heater is in the upper position to serve as a surface unit;

Fig. 5 is a schematic wiring diagram of a second embodiment of the invention in which the side heater is not used;

Fig. 6 is a top plan view with the horizontal heater in the upper position;

Fig. 7 is a schematic wiring diagram of a third embodiment;

Fig. 8 is a horizontal cross section of a terminal block used with the circuit shown in Fig. 7, certain details being omitted for clarity;

Fig. 9 is a vertical sectional view taken on line IX—IX of Fig. 8; and

Fig. 10 is the same as Fig. 9 but showing the contacts in engagement.

2

Referring to the accompanying drawings, in Fig. 1 I show a deep well cooker 10 comprising a cylindrical casing 11 closed at the bottom by a plate 12 and having an outwardly-disposed peripheral flange 13. This flange supports the deep well cooker 10 by overlying an inwardly-disposed flange 14 in an opening 15 of a range platform 16. The casing 11 has two similar openings, an upper opening 17 and directly below it a lower opening 18. Directly opposite and slightly above the opening 18 is an opening 19 in which there is disposed an over-temperature thermostat 20, which is biased to the left to give a positive thermal connection with a vessel 21 which is placed inside the casing 11. This thermostat is normally closed and opens only in the event of overheating of the vessel.

A terminal block assembly 23 carries an upper pair of upstanding leaf spring electrical contacts 24 and 25 and a lower pair of pendant leaf spring electrical contacts 26 and 27 which are disposed directly in line with openings 17 and 18 respectively. This terminal block is rigidly supported by the vertical leg of an L-shaped bracket 28 which is in turn attached by a bracket and screws or other suitable means to the underside of the range platform 16. Centrally disposed between the upper contacts 24 and 25 is an upstanding spring member 29, and similarly disposed between the lower contacts 26 and 27 is a pendant spring member 30. The L-shaped bracket has a horizontal leg 31 which is fastened to the casing bottom 12 by a nut and a screw, but spaced therefrom by an insulating spacer 33.

A horizontal heater 35 of the well-known sheathed type comprises a helically-wound resistance wire element 36, encased in a tubular metallic sheath 37 and imbedded in a highly compacted powdered insulating material 38. It is bent into a spiral form, as shown by Fig. 6, to form a grid 39 capable of supporting the vessel 21. The terminal portions 40 and 41 of the heater are brought down and out through a terminal shield 42 and carry electrical contacts 43 and 44 which are connected to the resistance element 36. The grid 39 is supported by a three-legged spider 45 to which it is attached by welding or other means. An escutcheon plate 46 may be attached to the center of the spider. A cylindrical rod 47 of devious shape is attached to the underside of the spider and has a projecting end portion 48 which is horizontally disposed in a central position adjacent the terminal portions 40 and 41 and acts as a locating member or finger.

A side heater 49 is wound about the outer periphery of the well casing 11 and is spaced therefrom by a sheet of mica 50 or other insulating material capable of withstanding high temperatures.

To further describe the well casing 11, it has a shoulder 52 adapted to support the horizontal heater when it is in the lower position as shown in Fig. 1. Diametrically opposite the bottom opening 18 is an indented portion 53 adapted to engage the tip of a leg 54 of the spider 45 to serve as a locking device for the horizontal heater.

It can now be seen that the horizontal heater in its lower position rests on the shoulder 52 with its end portions 40 and 41 inserted through the lower casing opening 18, and its terminal contacts 43 and 44 abutting the lower contacts 26 and 27. The locating member 48 is also inserted through the opening and is in biased engagement with the lower spring member 30. This bias urges the horizontal heater to the right into locking engagement with the indent 53 in the well casing.

Referring to the wiring diagram shown in Fig. 2, it is seen that a supply of electric power is brought into a control switch 55 by line conductors L1 and L2. Any suitable type of range switch may be used, but I have shown a switch of the type known as an infinite wattage control switch. As best shown by Fig. 3, the switch includes a pair of contacts 60 and 61. Contact 60 is known as a cycling contact and has an extended arm 62 which serves as a cam follower, being biased into engagement with a continuously-rotating cam 63. Contact 61 is known as a manually-adjustable contact and is biased into engagement with a manually-rotatable cam 64 which is rotated by a switch knob 65 attached to a shaft 66.

The principle of operation of this switch is that by making and breaking the circuit during each revolution of the cam 63, the length of the "on" period being adjustable, it is possible to control the wattage of the heaters 35 and 49 and thereby to vary the rate of heat delivery by these heaters. As the contact 61 is positioned toward the contact 60, the period of engagement is increased, and as it is moved away from the contact 60 the period of engagement is decreased. In the "off" position of the knob 65, the contact 61 is disposed out of engagement with contact 60 during the entire revolution of the cam 63, and in the high or full heat position, it is disposed to be in engagement for the full revolution. The switch 55 further includes contacts 58 and 59 which are closed by the switch knob 65 when in any "on" position and opened when the knob is in the "off" position.

As further shown in Figures 2 and 3, a conductor or wire 56 is connected to the line conductor L1 through the contacts 58 and 59, and a conductor or wire 57 is connected to the line conductor L2 through the pair of contacts 60 and 61. The wires 56 and 57 are connected to the upper contacts 24 and 25, respectively, and they are also connected to the contacts 26 and 27, respectively, except that the wire 56 is connected to the contact 26 through the thermostat 20 and the side heater 49 in series therebetween. Hence, when the horizontal heater 35 is connected in the lower position, its terminal contacts 43 and 44 abut spring contacts 26 and 27, completing a series circuit energizing side heater 49 and bottom heater 35.

To use the horizontal heater as a surface unit as shown in Fig. 4, the vessel 21 is removed from the well formed by the casing 11. To facilitate its removal, this vessel is equipped with handles 67. The horizontal heater is then removed from the lower position by grasping near the outer extremity of spider leg 54 and forcing slightly to the left to disengage the latch at indent 53. The heater is then lifted through an arc of about 45 degrees when the locating finger 48 and the terminal contacts 43 and 44 may be withdrawn from the casing opening 18, thus freeing the heater which may then be withdrawn from the well casing 11.

An annular support ring 68 is then placed in the platform opening 15, its purpose being to support the horizontal heater 35. As seen in Fig. 4, the support ring has an upper outwardly-disposed flange 69 resting on the platform and a lower inwardly-disposed flange 71. The support ring has a horizontally-disposed tongue 72 adapted to enter an opening 73 in the well casing. Diametrically opposite the tongue 72 is an opening 74 so disposed as to align with the opening 17 in the well casing 11 when the tongue 72 is inserted into the mating opening 73. The support ring is shown as having a detachable reflector pan 76. Furthermore, the reflector pan has an opening 77 in the bottom 78 and an outwardly-disposed peripheral flange by means of which it is supported by the inwardly-disposed flange 71 of the support ring. The reflector pan also has an opening 79 which aligns with the upper well casing opening 17.

The horizontal heater can now be mounted into place by tilting downwardly to the left at an angle of about 30 degrees and lowering it until the locating finger 48 can be inserted into the support ring opening 79 and through the well casing opening 17. The heater can now be latched in place by a slight downward forcing action in the vicinity of the tip of the spider leg 54 allowing the leg tip to enter an indent 80 provided in the support ring. Thus a latching engagement is attained which is maintained by a bias to the right exerted as the locating finger 48 abuts the upper spring member 29 and the heater contacts 43 and 44 abut the upper leaf spring contacts 24 and 25, respectively.

By again referring to the wiring diagram in Fig. 2, it can be seen that the removal of the horizontal heater 35 from the lower position will open the electrical connection at the lower contacts 26 and 27, thus preventing current from flowing through the side heater 49. Furthermore, since the horizontal heater is now connected to the upper contacts 24 and 25, the upper circuit is completed and the horizontal heater will be energized in the conventional surface heater unit fashion under the control of the switch 55.

With this arrangement, the horizontal heater may be provided with a high wattage rating as normally provided in surface cooking units to insure fast cooking when in the upper position. Since the horizontal heater is connected in series with the side heater when in the lower position, the wattage delivered to the heaters is substantially reduced, thereby eliminating danger of overheating.

The control switch 55 is manually adjustable to control the wattage of the horizontal heater 35 alone in the upper position, and of the side heater 49 and the horizontal heater 35 in the lower position. Since the adjustment is effected by varying the "on" period of the contacts 60 and 61, as previously described, the heat delivered by the heaters is always varied in the same proportion, regardless of the position of the heater 35.

A second embodiment of the invention is illustrated schematically by the wiring diagram shown in Fig. 5. In this scheme the side heater 49 and the thermostat 20 are not used, hence the cooking vessel will receive all its heat from the horizontal heater 35 whether it is used in the lower position or in the upper position.

A third embodiment of the invention is illustrated schematically by the wiring diagram shown in Fig. 7. This scheme also employs a two-wire source of electric power brought into the circuit by line conductors L₁ and L₂. A control switch 55, similar to that shown in Fig. 3, is used. As before, when the knob 65 is in the "off" position all line contacts are opened; and when the knob is in any "on" position, line conductor L₁ is connected to a conductor 82 and line conductor L₂ is intermittently connected through a cycling contact with a conductor 84.

The terminal block assembly used in this embodiment has the same upper contacts 24 and 25, which are connected to the conductors 82 and 84 respectively. However, the lower contacts are quite different, and are shown in Figs 8, 9 and 10. A pendant spring contact 86 adapted to make contact with terminal contact 43 of the bottom heater, and a set of contacts 88 and 90 adapted to abut and make electrical contact with each other when moved to the left by the terminal contact 44 of the horizontal heater, are carried by the lower portion of the terminal block 23. It will be noted that the horizontal leg 31 of the L-shaped bracket 28 has an opening 92. Adjacent this opening is attached a perforated insulating strip 94 which provides stops to limit the travel of the spring contacts when the heater is withdrawn.

The side heater 49 is connected to contact 86 by a conductor 96 and to contact 90 by a conductor 98. The conductor 82 is connected to line 96 through the thermostat 20. When the horizontal heater is in the lower position as shown in Fig. 7, the side heater 49 and the horizontal heater 35 are connected in parallel with each other across conductors 82 and 84.

When the switch knob 65 is in an "on" position, the cycling contact 60 and the manually adjustable contact 61 energizing conductor 84 are closed periodically allowing current to flow through conductor 82 and thermostat 20, where it divides, a portion going through conductor 96, side heater 49 and line 98 to contacts 90 and 88 to conductor 84, and the balance going through conductor 96 to contacts 86 and 43, through horizontal heater 35 to contacts 44, 90 and 88 to conductor 84. The wattage delivered to the above circuit may be regulated by the setting of the switch knob 65 to give infinite wattage control within the respective ranges of the horizontal heater and the side heater. If the thermostat 20 should open due to an excess heat within the vessel 21, both the side heater and the horizontal heater are disconnected from the power supply, thus protecting the device and vessel against destructive heat.

The bottom heater may be inserted into its upper position as previously outlined in this specification, its removal from the lower position causing the leaf spring contacts 86, 88 and 90 to return to their normal open positions as shown in Fig. 9, thus opening the circuit to the side heater.

While I have shown my invention in several forms, it will be obvious to those skilled in the art that it is not so limited, but is susceptible of various other changes and modifications without departing from the spirit thereof.

What I claim is:

1. In an electric range comprising a platform having an opening therein, the combination of a cooking well comprising a casing disposed beneath said opening, an electrical side heater element disposed about the periphery of said casing, a movable horizontal heater adjustable to an upper operating position adjacent the top of said casing and a lower operating position within said casing, a common control switch for said heaters, said control switch having a pair of mating contacts adapted to intermittently engage each other and means for varying the period of engagement of said contacts to vary the wattage delivered to the heaters, and switch means operable by said horizontal heater upon movement thereof to its lower position to connect said side heater, said horizontal heater unit and said control switch in series with each other and operable to connect said horizontal heater alone in series with said control switch when the horizontal heater is moved away from said lower position.

2. In an electric range comprising a platform having an opening therein, the combination of a cooking well comprising a casing disposed beneath said opening, an electrical side heater element disposed about the outer periphery of said casing, a removable horizontal heater unit adjustable to an upper operating position and a lower operating position, a set of electrical contacts disposed adjacent the upper portion of said casing and a set of contacts disposed adjacent the lower portion of said casing, said set of lower contacts including a contact connected to a terminal portion of said side heater, said horizontal heater having contacts at its terminal portions, at least two of said lower contacts engaging said horizontal heater contacts and said lower contacts effecting a circuit through both said heaters when said horizontal heater is in the lower position, and said upper contacts engaging said horizontal heater contacts and effecting a circuit through said horizontal heater alone when said horizontal heater is in the upper position.

3. In an electric range comprising a platform having an opening therein, the combination of a cooking well comprising a casing disposed beneath said opening, an electrical side heater element disposed about the outer periphery of said casing, a removable horizontal heater unit adjustable to an upper operating position and a lower operating position, said horizontal heater having its terminal portions at one side and said terminal portions having electrical contacts, a first set of electrical contacts connected to a power supply and disposed in a manner to be engaged by the horizontal heater contacts when said horizontal heater is in the upper position thereby energizing said horizontal heater, and a second set of contacts having one contact connected to one side of a power supply, said side heater being connected between another of said second set of contacts and another side of said power supply, and said second set of contacts being disposed in a manner to be engaged by the horizontal heater contacts when the horizontal heater is in said lower position, thus completing a series circuit through the side heater and the horizontal heater.

4. In an electric range comprising a platform having an opening therein, the combination of a cooking well comprising a casing disposed beneath said opening, an electrical side heater element disposed about the outer periphery of said casing, a removable horizontal heater unit adjustable to an upper operating position and a lower operating position, said horizontal heater having its terminal portions at one side and said terminal portions having electrical contacts, a first set of electrical contacts connected to a power supply and disposed in a manner to be engaged by the horizontal heater contacts when said horizontal heater is in the upper position thereby energizing said horizontal heater, and a second set of contacts comprising contacts connected to a power supply and a contact connected to said side heater, said second set of contacts being disposed and arranged in a manner to be engaged or moved into engagement with each other by said horizontal heater contacts when said horizontal heater is in the lower position, and to connect the horizontal heater and the side heater to said power supply.

5. In an electric range comprising a platform having an opening therein, the combination of a cooking well comprising a casing disposed beneath said opening, an electrical side heater element disposed about the outer periphery of said casing, a removable horizontal heater unit adjustable to an upper operating position and a lower operating position, said horizontal heater having its terminal portions at one side and said terminal portions having electrical contacts, a first set of electrical contacts connected to a power supply and disposed in a manner to be engaged by the horizontal heater contacts when said horizontal heater is in the upper position thereby energizing said horizontal heater, and a second set of contacts including a power supply contact and a contact connected to said side heater, said power supply contact and said side heater contact being normally out of engagement with each other and disposed and arranged in a manner to be engaged or moved into engagement with each other by one of said horizontal heater contacts when the horizontal heater is in the lower position, thus connecting the horizontal heater and the side heater to said power supply.

EARL K. CLARK.

REFERENCES CITED

The following references are of record in the file of this patent:

UNITED STATES PATENTS

| Number | Name | Date |
|---|---|---|
| 1,101,527 | Denhard | June 30, 1914 |
| 1,141,176 | Copeman | June 1, 1915 |
| 1,143,579 | Denhard | June 15, 1915 |
| 2,155,425 | LaMere | Apr. 25, 1939 |
| 2,229,873 | Rodgers | Jan. 28, 1941 |
| 2,257,580 | Trompeter | Sept. 30, 1941 |
| 2,260,793 | Russell | Oct. 28, 1941 |
| 2,416,645 | Rutenber | Feb. 25, 1947 |